Dec. 8, 1970  W. L. DUNCAN  3,545,868
OPTICAL COLOUR FILTER SELECTING DEVICE
Filed April 10, 1967  4 Sheets-Sheet 2

INVENTOR
WILLIAM L. DUNCAN
BY Cavanagh & Norman

Dec. 8, 1970     W. L. DUNCAN     3,545,868
OPTICAL COLOUR FILTER SELECTING DEVICE
Filed April 10, 1967     4 Sheets-Sheet 3
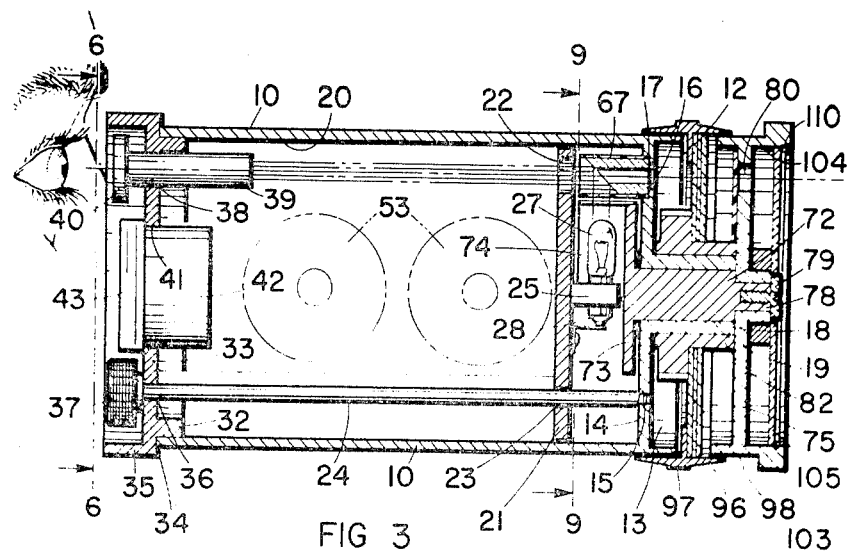
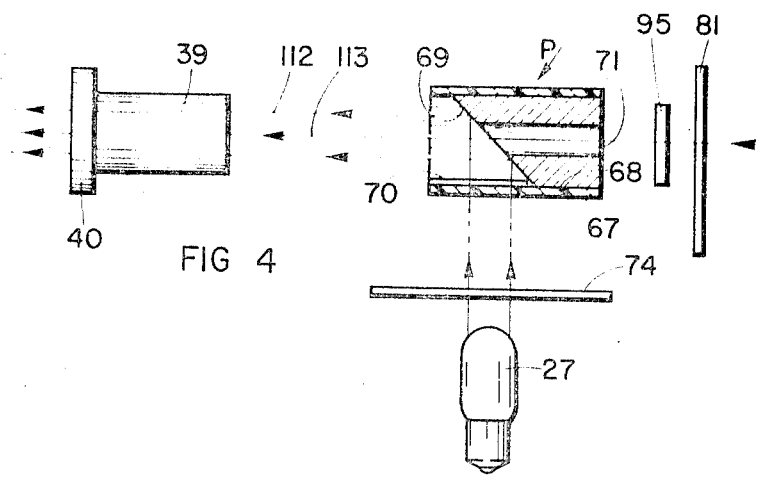
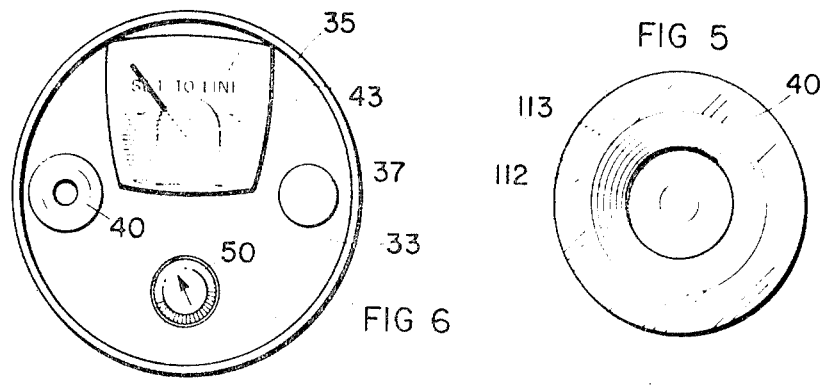
INVENTOR
WILLIAM L. DUNCAN
BY Cavanagh & Norman Dec. 8, 1970  W. L. DUNCAN  3,545,868
OPTICAL COLOUR FILTER SELECTING DEVICE
Filed April 10, 1967  4 Sheets-Sheet 4

INVENTOR
WILLIAM L. DUNCAN
BY *Cavanagh & Norman*

United States Patent Office 3,545,868
Patented Dec. 8, 1970

---

3,545,868
OPTICAL COLOUR FILTER SELECTING DEVICE
William Lutton Duncan, 60 Chestnut Park Road,
Toronto, Ontario, Canada
Filed Apr. 10, 1967, Ser. No. 629,687
Int. Cl. G01j 5/08; G01n 21/20
U.S. Cl. 356—175
4 Claims

ABSTRACT OF THE DISCLOSURE

This specification discloses a chromascope to be used in selecting the correct colour filter to be employed in photography under any particular condition of illumination. The chromascope comprises a standard light source in the form of an electric lamp with which are associated a diffuser and a colour filter; a casing enclosing the light source and having an end wall formed with an aperture that receives natural light from the scene to be photographed; an eyepiece mounted on an end wall of the casing remote from that having the aperture and in alignment therewith; a lens assembly within the casing associated with the eyepiece; a mirror having a central opening in the path of alignment of said aperture and eyepiece and arranged at a 45° angle with respect thereto with the mirror receiving light from the standard source; an adjustable neutral density filter operatively associated with each of said source and aperture; and a circularly arranged assembly of graduated colour filters rotatably mounted on said casing and adapted to be indexed into any of a plurality of positions in which one of the colour filters aligns with the aperture.

---

The present invention has to do with chromascopes and is concerned primarily with an instrument which accurately identifies and selects a colour filter which is to be used with the illumination obtaining at any particular scene or object to be photographed.

Substantially all photographic film is designed to be used with an illumination of 3200° Kelvin temperature. Other recording means such as slides are similarly balanced with respect to an intended temperature of illumination. When a photograph is taken under the prescribed balanced condition of illumination the apparent colour of the natural object being photographed is faithfully reproduced. However should the illumination be at a variance from that for which the film is designed it is necessary to place a colour filter in front of the camera to correct the variance. The present invention deals with the selection of the correct colour filter.

An important object of the invention is to provide a chromascope which includes a casing within which is mounted a standard light source that is balanced to the film or slide and which constitutes a basis of comparison. The casing has an aperture which receives natural light from the scene to be photographed, neutral density filters operatively associated with the aperture and source and adjustable, a circular assembly of graduated colour filters mounted on the casing and indexable into position in which any one of the filters aligns with the aperture, optical devices for bringing light from the source into close juxtaposition to natural light from the aperture for comparison purposes; and an eyepiece and associated lens arrangement for viewing the light.

It is evident that the standard light source is an important element of the present chromascope. If the instrument is to perform its intended function the source must be accurately balanced to the film or slide being used. The source takes the form of an electric bulb with which are associated a diffuser and colour filter. The bulb is powered to dry cells within the casing and a voltmeter is connected across the bulb. An adjustable rheostat is included in the circuit of the bulb and voltmeter. This rheostat may be adjusted to insure that the current flowing through the bulb has the correct voltage.

It has been found, as a practical matter, that the human eye is a poor judge of colour when the intensities of lights from two sources are different. Thus it is difficult, if not impossible, to make an accurate comparison between the colours of two lights if their intensities are different. An important feature of the present invention is to provide a neutral density filter for the natural light and another for the light from the standard source. These filters are adjustable and mechanically interlocked so that as the intensity of the natural light is decreased that from the standard source is increased. This makes it feasible to utilize a wide range of intensities.

Another important feature of the invention is the circular arrangement of the colour filters and their assembly on a disc that is rotatably mounted on the casing. An operator may index any of the gradulated filters into alignment with the aperture receiving the natural light until a matching condition with the standard source is achieved.

The close juxtaposition of the beam of natural light with respect to the beam from the standard source is also of the utmost importance. A so-called "prism unit" is provided for this purpose. This unit comprises a tube of light diffusing material and a colour filter is mounted on the interior of the tube on the side of the bulb. This tube is arranged coaxially with the beam of natural light and mounted therein; at an angle of 45° with respect to the axis of the tube, is a mirror having a central opening through which said beam of natural light passes. Light from the standard source is reflected in the form of a beam of ringlike cross section about the beam of natural light.

At the end of the casing remote from the aperture an eyepiece is mounted in alignment with the aperture and a lens assembly is located within the casing in operative relation to the eyepiece. The eyepiece is available of by an operator to inspect the two beams of light that have been brought into close juxtaposition by the prism unit.

Under some conditions the natural light passing through the aperture may be so intense as to impair the matching operation which is the essence of the present invention. With this condition in mind, a further object is to provide, in a chromascope of the type indicated, a disc that is rotatably mounted on the casing and which includes two arcuate sections. One of these is clear and the other is translucent whereby it is adapted to function as a diffuser of natural light going to the aperture. Either of these sections may be positioned over the aperture as occasion demands.

Various other more detailed objects and advantages of the invention, such as arise in connection with carrying out the above noted ideas in a practical embodiment, will in part become apparent, and in part be hereinafter stated, as the description of the invention proceeds.

For a full and more complete understanding of the invention reference may be had to the following description and accompanying drawing, wherein:

FIG. 3 is an axial section through the instrument with the batteries omitted.

FIG. 4 is a schematic view showing the paths taken by the light beams and the optical devices pertinent thereto.

FIG. 5 is a diagrammatic view illustrating the relative portions of the two beams of light.

FIG. 6 is an end elevation of the instrument taken from the viewing end taken about on the plane represented by the line 6—6 of FIG. 3.

Figure 1:
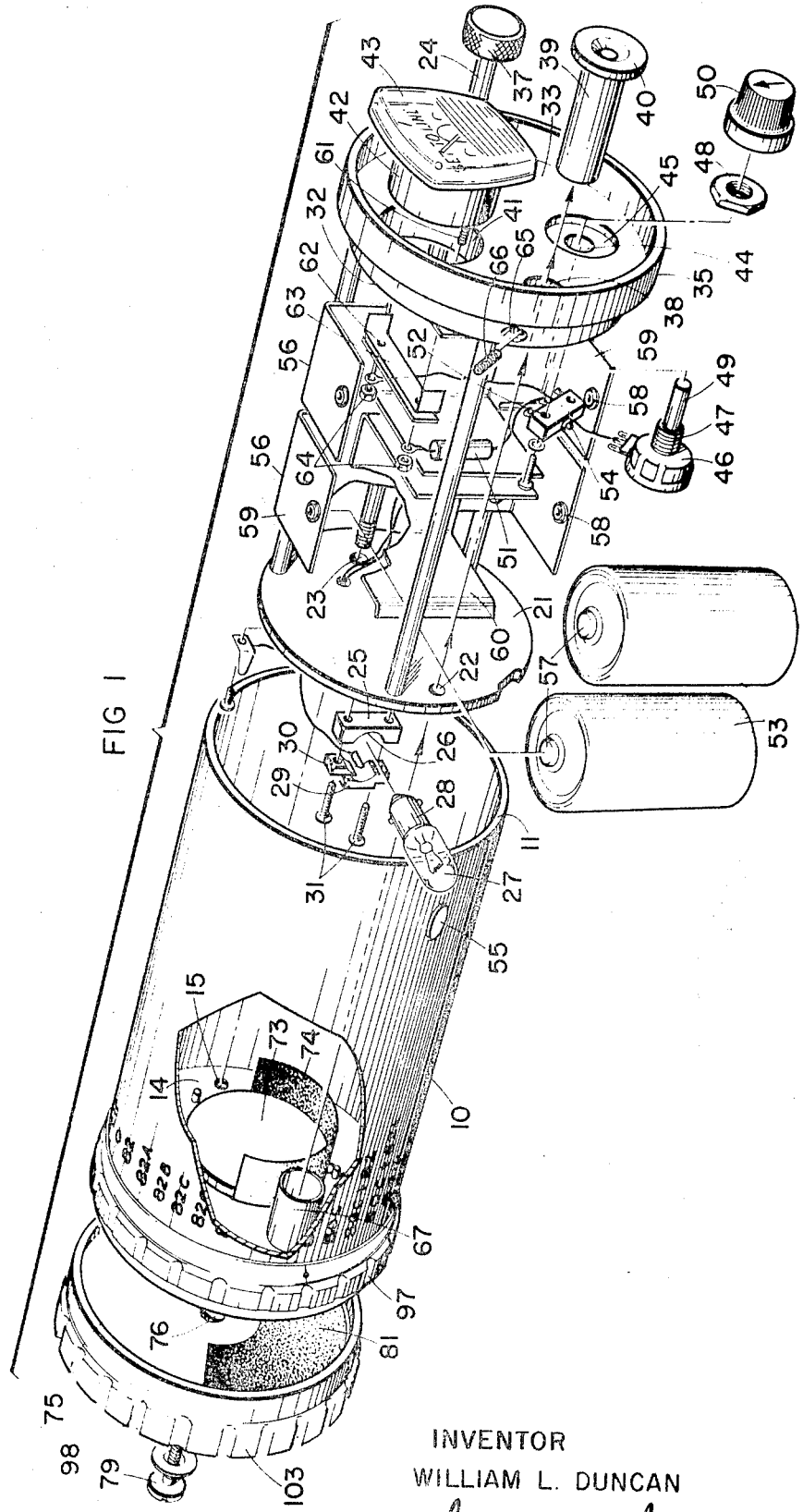
FIG. 1 is a perspective of a chromascope designed in accordance with the precepts of this invention with the various elements thereof depicted in a longitudinally exploded relation.

Referring now to the drawings wherein like reference characters denote corresponding parts and first more particularly to FIGS. 1 and 3 the chromascope of this invention is shown as including a cylindrical casing 10 of an appropriate metal such as aluminum and which has an open end at 11 (FIG. 1). The other end is designated 12 and extending inwardly therefrom is a counterbore 13. The latter terminates at an end wall 14 formed with a threaded opening 15 and, at a point substantially diametrically opposite to the opening 15 with an aperture 16. The latter is counterbored on its inner face as shown at 17.

Formed integrally with the end wall 14 is a tubular extension 18 having a bore 19 coaxial with the casing 10. The casing 10 has a bore 20 and received therein is a disc 21 having an opening 22 at one side thereof in alignment with the opening 16. Diametrically opposite to the opening 22 the disc 21 is formed with a hole 23 through which passes an anchoring bolt 24. An end of the latter is threaded and when the parts are assembled this threaded end is screwed into the opening 15 in end wall 14.

Mounted on the face of the disc 21 adjacent to the end 12 of the casing is a block 25 (FIG. 1) having an arcuate recess 26. A light bulb 27 has a base 28 received in the recess 26 and clamps 29 and 30 engage the base 28 to secure the lamp in position on the disc. Screws 31 pass through aligned openings in the clamps 29 and 30, block 25 and disc 21 to securely hold the lamp in position.

Fitted within the bore 20 of the casing 10 at the end 11 is an annular flange 32 projecting inwardly from an end plate 33. The latter has an annular shoulder 34 against which the end edge of the casing 10 abuts. Extending outwardly from the shoulder 34 is a cylindrical wall 35 which cooperates with the end plate 33 to provide a shallow cup-like recess at the end of the instrument.

The end plate 33 is formed with a hole 36 (FIG. 3) through which the bolt 24 passes. The latter carries a head 37 which is knurled to facilitate gripping as it is the operating member which is availed of to tighten the anchoring bolt.

The end plate 33 is formed with an aperture 38 which is in alignment with the openings 16 and 22. Received in the aperture 38 is the barrel 39 of an eyepiece 40. Also formed in the end plate 33 is a circular opening 41 which receives the cylindrical base 42 of a voltmeter 43. The end plate 33 is formed with another hole 44 (FIG. 1) which is counterbored at 45. An adjustable rheostat 46 has a threaded shank 47 received in the hole 44 and a nut 48 is threaded thereon to secure the rheostat in position. This nut is positioned in the counterbore 45. The rheostat 46 has an operating stem 49 on which is drivably mounted, at its outer end, an operating knob 50.

Included in the circuit of the voltmeter 43 and rheostat 46 is a resistor 51, an "on-off" switch 52, and dry cells 53. The latter are removably assembled within the casing 10 in the positions indicated by broken lines in FIG. 3. The switch 52 has an operating member 54 which engages a push button 55 in the casing 10.

Mounted within the casing 10 substantially midway thereof are a pair of clips 56, one for each of the batteries 53. Each end of each of the latter has a button-like projection 57 which is removably received in a recess 58 formed in an end flange 59 of the respective clip. Each of the latter also has side flanges 60 which grips a dry cell 53. The base 42 of the voltmeter 43 carries screw studs 61 which pass through openings 62 in a clamp 63 and nuts 64 are screwed onto the ends thereof to clamp the voltmeter in position.

The flange 32 is formed with a threaded socket 65 which receives a screw 66. After the barrel 39 of the eyepiece 40 is positioned in the opening 38 the screw 66 is tightened to secure the assembly.

A prism unit is shown in FIG. 4 and identified in its entirety by the reference character P. It comprises a tube 67 of translucent material whereby it is constituted a diffuser of light. One end of the tube 67 is received in the counterbore 17 whereby the tube aligns with the aperture 16. The tube 67 has a bore 68 and mounted within this bore is a glass piece 69 which has a mirrored surface and is disposed at an angle of 45° with respect to the axis of the tube. The mirrored surface 69 is in radial alignment with the lamp 27 and interposed between the two, and mounted within the tube 67 is a colour filter 70. The glass piece 69 is formed with a central opening 71 which is in alignment with openings 16 and 38.

Journalled in the base 19 of extension 18 is a shaft 72. Formed integrally with the inner end of the latter is a disc 73 and mounted on the peripheral edge of this disc 73 is a neutral density filter 74 (FIGS. 2 and 4) having a circumferential extent of substantially 180°. This filter 74 has a gradually varying opaqueness so that it may be rotated to provide a desired intensity of light from the lamp 27 which passes to the mirror 69.

A rotating end plate 75 has an axial opening 76 defined by a hub 77. The shaft 72 has a reduced extension 78 received in the hub 77 and a screw 79 threaded into the extension 78 secures the assembled relation. The rotating end plate 75 is formed with an arcuate slot 80 and on its inner face carries another neutral density filter 81. The latter has an extent of substantially 180° and is of a gradually varying degree of opaqueness.

It is evident that, as the end plate 75 is rotated the disc 73 is also rotated. Thus the neutral density filters 74 and 81 are rotated simultaneously. The varying degrees of opaqueness of the two filters are what might be called reversely arranged so that as the intensity of natural light admitted to the interior of the casing decreases that from the lamp 27 increases and vice versa.

Journalled on the exterior of the extension 18 is a sleeve 82 and formed integrally therewith is a gear 83 presenting a series of V-shaped teeth 84. The latter are interrupted by a recess 85 (FIG. 2) to provide a pronounced detent as will be later described. A pawl 86 has one end anchored to the end wall 14 and its free end carries a detent 87 adapted to be received in any of the teeth 84 or recess 85.

Figure 2:
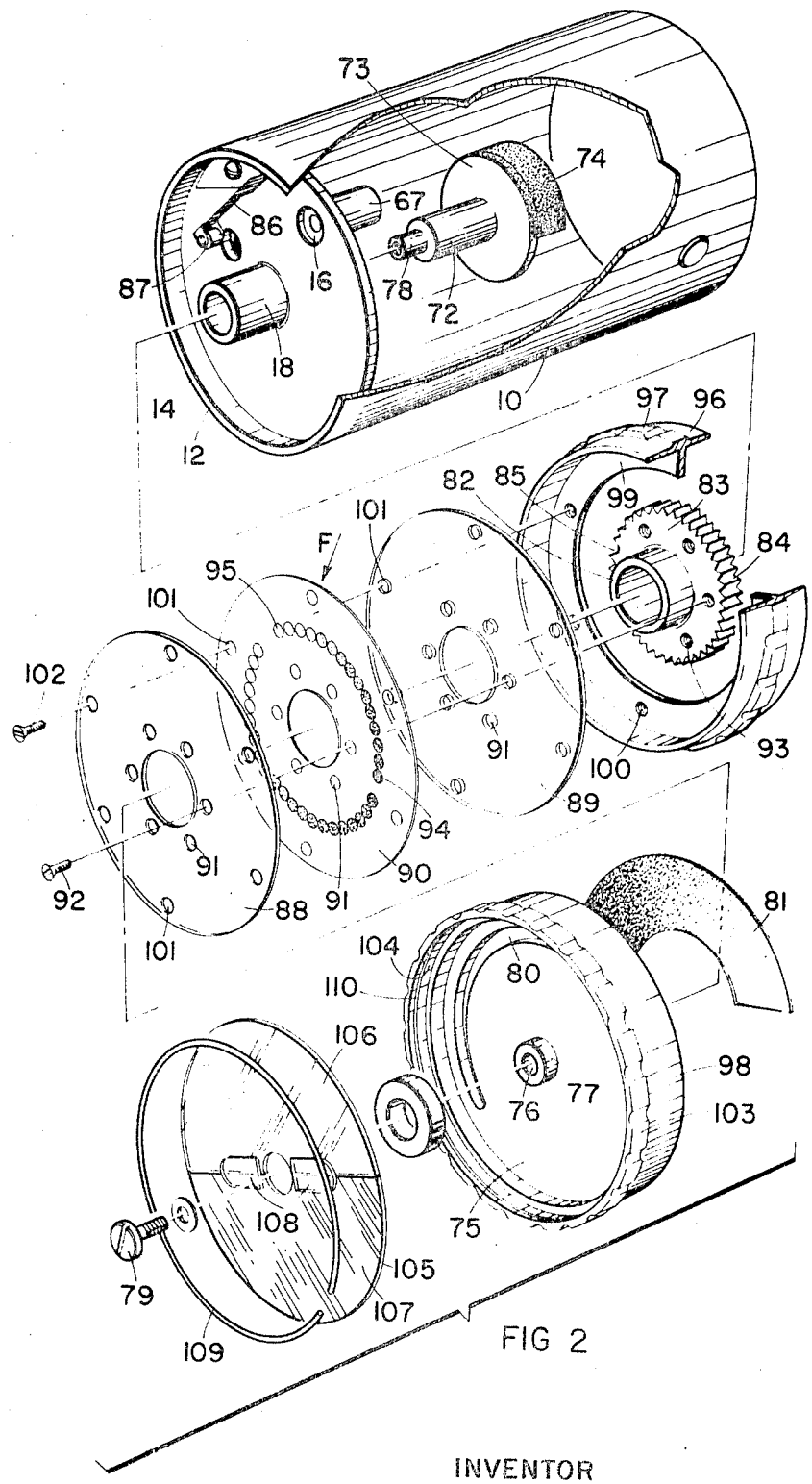
FIG. 2 is another perspective with the parts associated with the aperture end of the invention being illustrated in a laterally exploded relation.

An adjustable colour filter assembly is shown in FIG. 2 and referred to in its entirety by the reference character F. It comprises two outer transparent discs 88 and 89 and a carrier disc 90 sandwiched therebetween. All of the discs 88, 89 and 90 are formed with aligned openings 91 through which pass screws 92 the inner ends of which are screwed into threaded sockets 93 formed in the confronting face of the gear 83.

The carrier disc 90 is formed with a series of openings 94 arranged in a circle concentric with the axis of the instrument. Fitted in each opening 94 is a colour filter 95. Each of the colour filters 95 is of a different colour from the others and they are arranged in a graduated manner. In the embodiment of the invention herein disclosed there are thirty-eight of these colour filters as that is the range of colour filters ordinarily provided for use with cameras.

As shown in FIG. 2 a cylindrical band 96 has a central external rib 97 that is knurled whereby it is connectably adapted for use as an operating member. The band 96 overlies the casing 10 at the end thereof and also a cylindrical member 98 which carries the rotating end plate 75. Extending radially inwardly from the band 96 and centrally thereof is a flange 99 having openings 100 which align with openings 101 in the discs 88, 89 and 90. Screws 102 pass through these aligned openings to secure the operating band 96 to the filter assembly F.

The cylindrical member 98 terminates in a thickened end flange 103 which is knurled to facilitate gripping thereof. The member 98 has a base 104 and fitted into the latter is a disc 105. The latter is divided into two sections 106 and 107. The section 106 is clear and the section 107 is of a predetermined degree of translucency whereby it is constituted a diffuser. The disc 105 is provided with finger tabs 108 to facilitate adjustment. The disc 105 is held in position by an expanding split spring ring 109 which is received in a groove 110 formed in the face 104.

Figure 8:
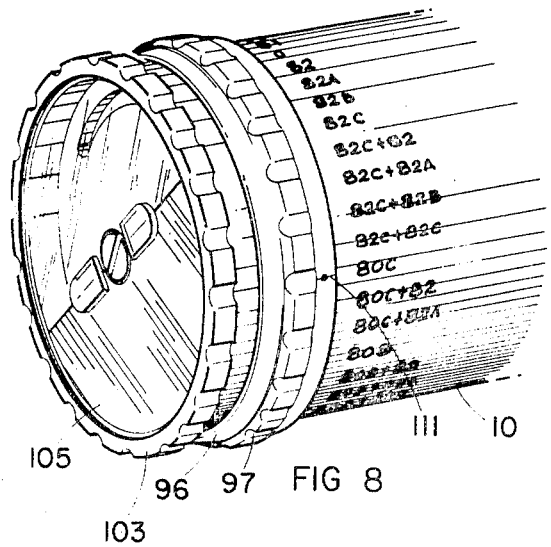
FIG. 8 is a detailed perspective of the end of the instrument remote from the viewing end.
Figure 9:
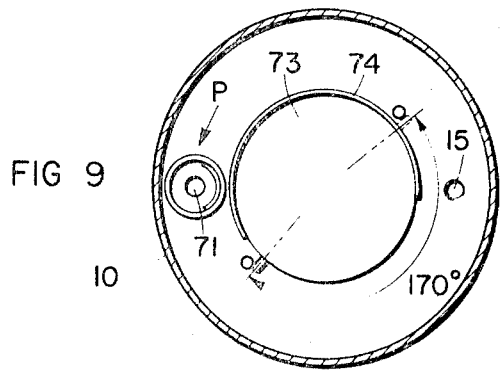
FIG. 9 is a transverse section taken about on the plane represented by the line 9—9 of FIG. 3.
Figure 7:
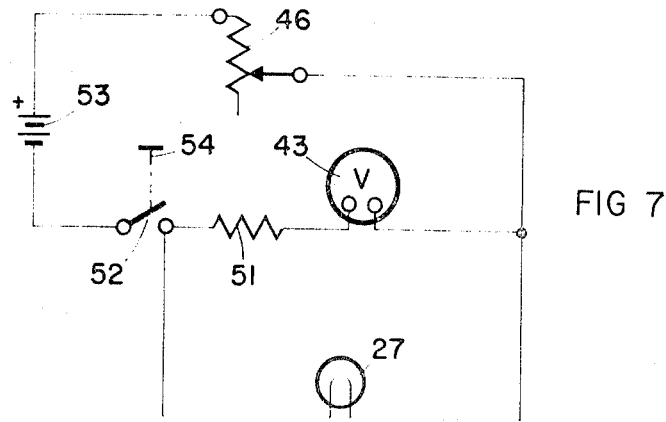
FIG. 7 is a wiring diagram of the light bulb and associated electric instrumentalities.

As is brought out more clearly in FIG. 8 in the casing 10 at the end adjacent to the band 96 is provided with indicia identifying different colour filters. The indicia employed are those commonly used to identify the colour filters that are placed in front of a camera. The adjacent end portion of the band 96 is provided with an appropriate mark 111 which is brought opposite to one of the elements of the indicia as the band 96 is rotated.

OPERATION

In describing the manner in which the chromascope of this invention is used it must first be explained that cameras are used under either artificial or natural light. There is one class or range of colour filters for natural light and another class for artificial light. The recess 85 in the teeth 84 is the dividing line for these two classes where the subject instrument is concerned. Thus with the detent 87 received in the recess 85 the operator is advised as to which direction to turn the band 96 by the condition of illumination which obtains, that is either natural or artificial.

When the operator is able to view the light illuminating the photographic scene directly the translucent section 107 is brought into effective position. However, should it be impractical to do so and it is necessary to assume a position on the same side of the scene from which the light emanates a white card is positioned in the path of the light at the scene and the operator views this white card through clear section 106 which is brought into effective position.

At the start of an operative period the button 54 is depressed to complete the circuit to the lamp 27. As this is the standard source that is the basis of comparison it must provide a light of an accurately predetermined value. The voltmeter 43 indicates the voltage passing through the lamp 27 as it is in parallel therewith. Any adjustment within a certain range may be made by the rheostat 46 by means of the operating member 50. Should the dry cells 53 be so weak as to provide an insufficient voltage they are replaced.

An appropriate arrangement of lens (not illustrated) is included in the barrel 39 of the eyepiece 40. The operator now inspects the light falling on a photographic scene through the eyepiece 40. Upon referring to FIG. 4 it will be seen that light from the lamp 27 passes through the neutral filter 74, diffuser tube 67 and colour filter 70 whereupon it strikes the mirror 69 and is reflected therefrom in the form of a beam 112 (FIG. 5) of ringlike cross section. It will be understood that the lamp 27 and associated parts constituting the standard source are designed to closely simulate the illumination with which the film or recording medium is intended to be used.

Natural light from the scene or object to be photographed first passes through either the section 107 or 106 of the disc 105 and then through the neutral density filter 81. It then passes through the particular colour filter 95 of the colour filter assembly F which has been brought into alignment with the aperture 16. This natural light now takes the form of a solid beam of circular cross section which passes through the opening 71 in the mirror 69. This solid beam is represented at 113 in FIG. 5 and is located within the ringlike beam 112. Thus the two beams are closely positioned for comparison purposes.

The operator now avails of the operating bands 103 and 97. By adjusting the ring 103 intensities of the natural light and that from the lamp 27 are changed at the same time. Due to the relation of the neutral filters 74 and 81 as the natural light decreases that from the lamp 27 increases, and vice versa. This means that an operating range of 180° for the neutral density filters is sufficient.

By rotating the band 96 the colour filters 95 are successively indexed into effective position. The adjustments of the density filters and colour filters are continued until the beam 112 and 113 appear to have the same colour appearance. When this is achieved the operator looks at the indicia on casing 10 and the mark 111 designates the correct colour filter to be used with the camera in use under the condition of illumination of the natural light entering the instrument.

While preferred specific embodiments of the invention are hereinbefore set forth it is to be clearly understood that the invention is not to be limited to the exact constructions, mechanisms, and designs illustrated and described because various modifications of these details may be provided in putting the invention into practice within the purview of the appended claims.

What is claimed is:

1. In a chromascope intended for use in selecting a colour filter for a prescribed amount of colour correction for use with a camera including a recording surface; a casing having an end wall formed with an aperture for receiving a beam of natural light from a scene to be photographed; a standard light source within said casing generating a beam closely simulating the illumination for which the recording surface of the camera has been designed; a neutral density filter for said natural light beam and in operative relation to said aperture; a second neutral density filter for said beam from said source; each of said filters being adjustable, optical means for bringing said beams into close juxtaposition for comparison purposes; an eyepiece for inspecting said beams; an adjustable colour filter in operative relation to said aperture and through which said beam of natural light passes, said adjustable neutral density filters being mechanically interlocked and reversely arranged so that as the intensity of one light is increased the other is decreased and vice versa.

2. The chromascope of claim 1 together with a disc adjustably mounted in said casing in front of said aperture and having a clear section and a translucent section either of which is adapted to be brought into effective position in relation to said aperture.

3. For use in selecting a colour filter for a required amount of colour correction in conjunction with a camera having a recording surface designed for a particular condition of illumination, a chromascope comprising: a casing having an aperture for receiving a beam of natural light; a light source within said casing generating a beam of standard light; optical means for bringing said beams into close juxtaposition for comparison purposes; adjustable neutral density filters in the casing and in operative relation to said beams; an adjustable colour filter for said beam of natural light; and an eyepiece on the casing for inspecting said beams, said density filters being mechanically interlocked and rotatable in the casing.

4. The chromascope of claim 1 together with a gear wheel having teeth on which said colour filter is mounted, and a detent in the casing cooperating with said teeth for indexing the colour filter into a required position in relation to the aperture.

References Cited

UNITED STATES PATENTS

| | | | |
|---|---|---|---|
| 2,045,704 | 6/1936 | Ferree et al. | 356—189 X |
| 1,482,441 | 2/1924 | Schlichter | 95—10 |
| 1,519,919 | 12/1924 | Klein | 350—172 X |
| 1,697,928 | 1/1929 | Osborne | 356—175 |
| 2,147,902 | 2/1939 | Jakosky | 356—175 |
| 2,649,017 | 8/1953 | McCarty | 95—10 X |
| 2,703,035 | 3/1955 | Tobler | 95—10 X |
| 2,715,352 | 8/1955 | Jobe | 350—172 |
| 2,927,500 | 3/1960 | Belanger et al. | 356—175 X |
| 3,269,255 | 8/1966 | Shaw | 356—43 X |

FOREIGN PATENTS

| | | | |
|---|---|---|---|
| 1,122,285 | 9/1956 | France | 355—35 |
| 1,185,396 | 1/1965 | Germany | 356—175 |

RONALD L. WIBERT, Primary Examiner

R. J. WEBSTER, Assistant Examiner

U.S. Cl. X.R.

95—10; 350—171; 355—32; 356—45, 46